(12) United States Patent
Lee et al.

(10) Patent No.: US 8,428,013 B2
(45) Date of Patent: Apr. 23, 2013

(54) METHOD OF PERFORMING RANDOM ACCESS IN A WIRELESS COMMUNCATION SYSTEM

(75) Inventors: Young Dae Lee, Anyang-si (KR); Sung Duck Chun, Anyang-si (KR); Sung Jun Park, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 135 days.

(21) Appl. No.: 12/312,172

(22) PCT Filed: Oct. 30, 2007

(86) PCT No.: PCT/KR2007/005384
§ 371 (c)(1),
(2), (4) Date: Apr. 29, 2009

(87) PCT Pub. No.: WO2008/054112
PCT Pub. Date: May 8, 2008

(65) Prior Publication Data
US 2010/0067495 A1  Mar. 18, 2010

Related U.S. Application Data

(63) Continuation of application No. 60/863,545, filed on Oct. 30, 2006.

(30) Foreign Application Priority Data

Feb. 7, 2007  (KR) .................. 10-2007-0012749

(51) Int. Cl.
*H04B 7/216* (2006.01)
*H04J 3/06* (2006.01)
*H04W 4/00* (2009.01)
*H04W 72/00* (2009.01)

(52) U.S. Cl.
USPC ........ 370/329; 370/342; 370/350; 455/435.1; 455/450

(58) Field of Classification Search .................. 370/329, 370/335, 338, 342, 324, 350; 455/403, 450, 455/435.1
See application file for complete search history.

(56) References Cited

U.S. PATENT DOCUMENTS

| 4,205,200 A | 5/1980 | Parikh et al. |
| 5,588,009 A | 12/1996 | Will |

(Continued)

FOREIGN PATENT DOCUMENTS

| CN | 1719932 | 1/2006 |
| CN | 1731887 A | 2/2006 |

(Continued)

OTHER PUBLICATIONS

LG Electronics Inc: "PDCP retransmissions" 3GPP Draft; R2-073041 PDCP Retransmissions_V2, Aug. 16, 2007, XP050135778.

(Continued)

*Primary Examiner* — Michael Thier
*Assistant Examiner* — Awet Haile
(74) *Attorney, Agent, or Firm* — McKenna Long & Aldridge LLP

(57) ABSTRACT

A method of performing random access in a wireless communication system is disclosed. The method of performing random access in a user equipment of a wireless communication system which uses multiple carriers includes transmitting a preamble for random access to a network, receiving a random access response message from the network in response to the preamble, transmitting a connection setup request message to the network, the connection setup request message requesting connection establishment with the network, and receiving a first message from the network, the first message including connection setup information and contention resolution information in a random access procedure. If a user equipment identifier of the user equipment is included in the message, the user equipment determines that it has successfully performed random access and performs a next procedure in accordance with the connection setup information. If the user equipment identifier of the user equipment is not included in the message, the user equipment determines that it has failed in random access and transmits a random access preamble to the network again after the lapse of a predetermined time period.

10 Claims, 6 Drawing Sheets

U.S. PATENT DOCUMENTS

| | | |
|---|---|---|
| 6,157,833 A | 12/2000 | Lawson-Jenkins et al. |
| 6,233,430 B1 | 5/2001 | Helferich |
| 6,324,171 B1 | 11/2001 | Lee et al. |
| 6,353,628 B1 | 3/2002 | Wallace et al. |
| 6,526,027 B1 | 2/2003 | Yeom |
| 6,567,409 B1 | 5/2003 | Tozaki et al. |
| 6,725,267 B1 | 4/2004 | Hoang |
| 6,785,256 B2 | 8/2004 | O'Neill |
| 6,795,419 B2 | 9/2004 | Parantainen et al. |
| 7,039,425 B1 | 5/2006 | Mazawa et al. |
| 7,197,317 B2 | 3/2007 | Parkvall et al. |
| 7,245,707 B1 | 7/2007 | Chan |
| 7,373,148 B2 | 5/2008 | Kim et al. |
| 7,443,813 B2 | 10/2008 | Hwang et al. |
| 7,525,908 B2 | 4/2009 | Olsson et al. |
| 7,551,643 B2 | 6/2009 | Yeo et al. |
| 7,606,370 B2 | 10/2009 | Lillie et al. |
| 7,680,058 B2 | 3/2010 | Seurre et al. |
| 7,769,351 B2 | 8/2010 | Kwak et al. |
| 7,801,527 B2 | 9/2010 | Putcha |
| 7,864,731 B2 | 1/2011 | Forsberg |
| 7,899,451 B2 | 3/2011 | Hu et al. |
| 7,912,471 B2 * | 3/2011 | Kodikara Patabandi et al. .............. 455/450 |
| 7,916,697 B2 | 3/2011 | Eklund |
| 7,958,542 B2 | 6/2011 | Herrmann |
| 8,064,676 B2 | 11/2011 | Li et al. |
| 2001/0017850 A1 | 8/2001 | Kalliokulju et al. |
| 2001/0034791 A1 | 10/2001 | Clubb et al. |
| 2001/0044322 A1 | 11/2001 | Raaf |
| 2002/0028690 A1 | 3/2002 | McKenna et al. |
| 2002/0057663 A1 | 5/2002 | Lim |
| 2002/0059464 A1 | 5/2002 | Hata et al. |
| 2002/0091860 A1 | 7/2002 | Kalliokulju et al. |
| 2002/0114294 A1 | 8/2002 | Toskala et al. |
| 2003/0007490 A1 | 1/2003 | Yi et al. |
| 2003/0007512 A1 | 1/2003 | Tourunen et al. |
| 2003/0050078 A1 | 3/2003 | Motegi et al. |
| 2003/0119488 A1 | 6/2003 | Hans et al. |
| 2003/0123485 A1 | 7/2003 | Yi et al. |
| 2003/0139170 A1 | 7/2003 | Heo |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 | 11/2003 | Willenegger et al. |
| 2003/0223452 A1 | 12/2003 | Toskala et al. |
| 2004/0014452 A1 * | 1/2004 | Lim et al. .............. 455/403 |
| 2004/0028078 A1 | 2/2004 | Beckmann et al. |
| 2004/0039830 A1 | 2/2004 | Zhang et al. |
| 2004/0042507 A1 | 3/2004 | Pelletier et al. |
| 2004/0087320 A1 | 5/2004 | Kim et al. |
| 2004/0100940 A1 | 5/2004 | Kuure et al. |
| 2004/0117860 A1 | 6/2004 | Yi et al. |
| 2004/0121771 A1 | 6/2004 | Song et al. |
| 2004/0147269 A1 | 7/2004 | Kim |
| 2004/0148427 A1 | 7/2004 | Nakhjiri et al. |
| 2004/0180675 A1 | 9/2004 | Choi et al. |
| 2004/0185837 A1 | 9/2004 | Kim et al. |
| 2004/0202107 A1 | 10/2004 | Bensimon et al. |
| 2004/0229605 A1 | 11/2004 | Hwang et al. |
| 2004/0233870 A1 | 11/2004 | Willenegger et al. |
| 2004/0242195 A1 | 12/2004 | Chun et al. |
| 2004/0253959 A1 | 12/2004 | Hwang et al. |
| 2005/0009527 A1 | 1/2005 | Sharma |
| 2005/0032555 A1 | 2/2005 | Jami et al. |
| 2005/0037767 A1 | 2/2005 | Kim et al. |
| 2005/0041610 A1 | 2/2005 | Lee et al. |
| 2005/0041681 A1 | 2/2005 | Lee et al. |
| 2005/0053029 A1 | 3/2005 | Lee et al. |
| 2005/0063347 A1 | 3/2005 | Sarkkinen et al. |
| 2005/0070253 A1 | 3/2005 | Farnsworth et al. |
| 2005/0085254 A1 | 4/2005 | Chuah et al. |
| 2005/0094670 A1 | 5/2005 | Kim |
| 2005/0100048 A1 | 5/2005 | Chun et al. |
| 2005/0141462 A1 | 6/2005 | Aerrabotu et al. |
| 2005/0141541 A1 | 6/2005 | Cuny et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0265294 A1 | 12/2005 | Hu et al. |
| 2005/0286470 A1 | 12/2005 | Asthana et al. |
| 2005/0288022 A1 | 12/2005 | Ryu et al. |
| 2006/0013165 A1 | 1/2006 | Choi et al. |
| 2006/0034335 A1 | 2/2006 | Karaoguz et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0126570 A1 | 6/2006 | Kim et al. |
| 2006/0165045 A1 | 7/2006 | Kim et al. |
| 2006/0187846 A1 | 8/2006 | Pelletier et al. |
| 2006/0195540 A1 | 8/2006 | Hamilton et al. |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0024972 A1 | 2/2007 | Kuerz et al. |
| 2007/0041349 A1 | 2/2007 | Kim et al. |
| 2007/0041382 A1 | 2/2007 | Vayanos et al. |
| 2007/0047452 A1 | 3/2007 | Lohr |
| 2007/0047582 A1 | 3/2007 | Malkamaki |
| 2007/0060139 A1 | 3/2007 | Kim et al. |
| 2007/0064631 A1 | 3/2007 | Tseng et al. |
| 2007/0064665 A1 | 3/2007 | Zhang et al. |
| 2007/0155389 A1 | 7/2007 | Zhang |
| 2007/0155390 A1 | 7/2007 | Kodikara Patabandi et al. |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0178875 A1 | 8/2007 | Rao et al. |
| 2007/0206531 A1 * | 9/2007 | Pajukoski et al. .............. 370/329 |
| 2007/0224993 A1 | 9/2007 | Forsberg |
| 2007/0248075 A1 | 10/2007 | Liu et al. |
| 2007/0254679 A1 | 11/2007 | Montojo et al. |
| 2007/0258591 A1 | 11/2007 | Terry et al. |
| 2007/0291634 A1 | 12/2007 | Kwon et al. |
| 2007/0291646 A1 | 12/2007 | Ohishi et al. |
| 2007/0291673 A1 | 12/2007 | Demirhan et al. |
| 2007/0291695 A1 | 12/2007 | Sammour et al. |
| 2007/0291719 A1 * | 12/2007 | Demirhan et al. ............ 370/338 |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2007/0293224 A1 | 12/2007 | Wang et al. |
| 2008/0004058 A1 | 1/2008 | Jeong et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0186946 A1 | 8/2008 | Marinier et al. |
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0259912 A1 | 10/2008 | Wang et al. |
| 2008/0267126 A1 | 10/2008 | Vujcic |
| 2008/0267405 A1 | 10/2008 | Vialen et al. |
| 2008/0268850 A1 | 10/2008 | Narasimha et al. |

| | | | |
|---|---|---|---|
| 2008/0273610 A1* | 11/2008 | Malladi et al. ............... 375/260 |
| 2008/0280567 A1 | 11/2008 | Sharma |
| 2008/0285691 A1 | 11/2008 | Onggosanusi et al. |
| 2008/0287091 A1 | 11/2008 | Suzuki et al. |
| 2008/0310452 A1 | 12/2008 | Vedantham et al. |
| 2008/0316959 A1 | 12/2008 | Bachl et al. |
| 2009/0005051 A1 | 1/2009 | Voyer et al. |
| 2009/0022107 A1 | 1/2009 | Kapoor et al. |
| 2009/0034466 A1 | 2/2009 | Lindskog et al. |
| 2009/0040982 A1 | 2/2009 | Ho et al. |
| 2009/0086659 A1 | 4/2009 | Pani et al. |
| 2009/0086710 A1 | 4/2009 | Ho |
| 2009/0092076 A1 | 4/2009 | Zheng et al. |
| 2009/0109912 A1 | 4/2009 | DiGirolamo et al. |
| 2009/0124259 A1 | 5/2009 | Attar et al. |
| 2009/0143074 A1 | 6/2009 | Pelletier et al. |
| 2009/0163199 A1 | 6/2009 | Kazmi et al. |
| 2009/0181710 A1 | 7/2009 | Pani et al. |
| 2009/0207771 A1 | 8/2009 | Lindskog |
| 2009/0239538 A1 | 9/2009 | Motegi et al. |
| 2009/0264164 A1 | 10/2009 | Chun et al. |
| 2009/0318170 A1 | 12/2009 | Lee et al. |
| 2010/0027413 A1 | 2/2010 | Park et al. |
| 2010/0046384 A1 | 2/2010 | Lee et al. |
| 2010/0061330 A1 | 3/2010 | Hanov |
| 2010/0067495 A1 | 3/2010 | Lee et al. |
| 2010/0075635 A1 | 3/2010 | Lim et al. |
| 2010/0128669 A1 | 5/2010 | Chun et al. |
| 2010/0137016 A1 | 6/2010 | Voyer |
| 2010/0165901 A1 | 7/2010 | Kim |
| 2010/0195568 A1 | 8/2010 | Iimori |
| 2010/0227614 A1 | 9/2010 | Chun |
| 2010/0238799 A1 | 9/2010 | Sebire |
| 2010/0238903 A1 | 9/2010 | Kitazoe |
| 2010/0254340 A1 | 10/2010 | Park et al. |
| 2010/0265896 A1 | 10/2010 | Park et al. |
| 2010/0272004 A1 | 10/2010 | Maeda et al. |
| 2010/0309877 A1 | 12/2010 | Damnjanovic et al. |
| 2011/0039536 A1 | 2/2011 | Lee et al. |
| 2011/0090836 A1 | 4/2011 | Mochizuki et al. |
| 2011/0116436 A1 | 5/2011 | Bachu et al. |
| 2011/0182243 A1 | 7/2011 | Gallagher et al. |
| 2011/0207427 A1 | 8/2011 | Kitani et al. |
| 2011/0261743 A1 | 10/2011 | Futaki et al. |
| 2012/0002589 A1 | 1/2012 | Saifullah et al. |

FOREIGN PATENT DOCUMENTS

| | | |
|---|---|---|
| CN | 1835627 A | 9/2006 |
| EP | 0 889 664 A2 | 1/1999 |
| EP | 1 148 753 | 10/2001 |
| EP | 1 168 877 | 1/2002 |
| EP | 1 209 938 | 5/2002 |
| EP | 1 304 898 | 4/2003 |
| EP | 1 315 356 | 5/2003 |
| EP | 1 318 632 | 6/2003 |
| EP | 1337124 A2 | 8/2003 |
| EP | 1372310 A1 | 12/2003 |
| EP | 1 420 551 | 5/2004 |
| EP | 1 501 328 | 7/2004 |
| EP | 1 511 245 | 3/2005 |
| EP | 1 720 373 | 11/2006 |
| EP | 1720322 A1 | 11/2006 |
| EP | 1932380 | 6/2008 |
| EP | 2087653 | 8/2009 |
| JP | 6-006294 | 1/1994 |
| JP | 2002-539686 | 11/2002 |
| JP | 2003-504935 | 2/2003 |
| JP | 2003-087180 | 3/2003 |
| JP | 2003-196775 | 7/2003 |
| JP | 2003-235064 | 8/2003 |
| JP | 2004-134904 A | 4/2004 |
| JP | 2005-39726 A | 2/2005 |
| JP | 2005-057787 | 3/2005 |
| JP | 2005-354488 | 12/2005 |
| JP | 2006-505979 | 2/2006 |
| JP | 2006-067115 | 3/2006 |
| JP | 2006-528456 | 12/2006 |
| JP | 2007-165635 | 6/2007 |
| JP | 2008-535370 | 8/2008 |
| JP | 2008-539678 | 11/2008 |
| JP | 2009-540721 | 11/2009 |
| JP | 2009-542100 | 11/2009 |
| KR | 10-2001-0015234 A | 2/2001 |
| KR | 10-2001-0105240 | 11/2001 |
| KR | 10-2003-0026924 | 4/2003 |
| KR | 10-2004-0039044 | 5/2004 |
| KR | 10-2004-0048675 | 6/2004 |
| KR | 10-2005-0008440 | 1/2005 |
| KR | 10-2005-0027972 | 3/2005 |
| KR | 10-2005-0096763 | 10/2005 |
| WO | WO 00/74416 | 12/2000 |
| WO | WO 02/39622 A1 | 5/2002 |
| WO | WO 2004/043094 | 5/2004 |
| WO | WO 2004/064272 | 7/2004 |
| WO | WO-2005/048613 A1 | 5/2005 |
| WO | WO 2006/000876 A1 | 1/2006 |
| WO | WO 2006/011763 A2 | 2/2006 |
| WO | WO 2006/018670 | 2/2006 |
| WO | WO 2006/049441 A1 | 5/2006 |
| WO | WO 2006/075820 A1 | 7/2006 |
| WO | WO 2006/104344 | 10/2006 |
| WO | WO 2006/109851 | 10/2006 |
| WO | WO 2006/116620 | 11/2006 |
| WO | WO 2007/025138 | 3/2007 |
| WO | WO 2007/052888 | 5/2007 |
| WO | WO 2007/078155 | 7/2007 |
| WO | WO 2007/078172 | 7/2007 |
| WO | WO 2007/078929 A2 | 7/2007 |
| WO | WO 2007/133034 | 11/2007 |
| WO | WO 2008/111684 A1 | 9/2008 |
| WO | WO 2009/084998 | 7/2009 |

OTHER PUBLICATIONS

LG Electronics Inc: "Contents of PDCP Status Report R2-07xxxx", 3GPP TSG-RAN WG2, 59, Oct. 8, 2007, pp. 1-3, XP002580785.

"PDCP Structure and Traffic Path" 3GPP Draft; R2-073259, Aug. 16, 2007, XP050135985.

LG Electronics: "UL Timing Control related to Contention Resolution", 3GPP TSG-RAN WG2 #61bis, Shenzhen, China, Mar. 31-Apr. 4, 2008, R2-081607, XP050139334.

3rd Generation Partnership Project: Evolved Universal Terrestrial Radio Access (E-UTRA) Medium Access Control (MAC) protocol specification (Release 8), Technical Specification Group Radio Access Network, Mar. 1, 2008, XP050377617.

IPwireless: "Layer 2 functions for LTE", 3GPP TSG RAN WG2 #48bis, R2-052377, Oct. 2005.

Samsung Electronics Co., Ltd.: "Selective forwarding/retransmission during HO", 3GPP TSG-RAN2 Meeting #56BIS, R2-070130, Jan. 2007.

Samsung Electronics Co., Ltd.: "Re-use of PDCP SN at ARQ level", 3GPP TSG-RAN2 Meeting #53bis, R2-061829, Jun. 2006.

NTT Docomo et al: "MAC PDU structure for LTE", 3GPP TSG RAN WG2 #56bis, R2-070280, Jan. 2007, XP050133369.

Catt et al: "Enhancement to Buffer Status Reporting", 3GPP TSG-RAN WG2 #57bis, R2-071345, Mar. 2007, XP050134291.

Asustek: "Granularity Consideration for Variable RLC PDUsizes"; R2-070336, XP050133423, Jan. 12, 2007.

3GPP; "Technical Specification Group Radio Access Network"; Medium Access control (MAC) protocol specification (Release 7); XP050367709, Mar. 1, 2007.

Bosch: "Header Compression Signalling" 3GPP Draft; XP050114120, Nov. 29, 1999.

3GPP; "Packet Data Convergence Protocol (PDCP) Specification (Release 7)", 3GPP TS 25.323, XP050367856, Mar. 1, 2007.

3GPP-RAN WG2, Meeting #56-bis, R2-070107, "Requirements for redirection in E-UTRAN", Nokia, Jan. 2007.

R2-070096, "MAC PDU format for LTE", 3GPP TSG RAN WG2 #56bis, Jan. 2007.

R2-050852, "Relative Buffer Status Reporting", 3GPP TSG RAN WG2 meeting #46bis Apr. 2005.

Youjun Gao et al: "Research on the access network and MAC technique for beyond 3G systems" IEEE Wireless Communications, IEEE Service Center, Piscataway, NJ, US, vol. 14, No. 2, Apr. 1, 2007, pp. 57-61, XP011184637 ISSN: 1536-1284.

Alcatel-Lucent: "Downlink Control Signaling and Multiplexing for VOIP, R1-071721", $3^{RD}$ Generation Partnership Project (3GPP) Technicalspecification Group (TSG) Radio Access Network (RAN); Workinggroup 1 (WG1), No. 48bis, Mar. 26, 2007, pp. 1-4, XP002460800.

Nokia Corporation, Nokia Siemens Networks: "MAC Header Format, R2-073891", #GPP TSG-RAN WG2 meeting 59bis, Oct. 1, 2007, XP002602993.

LG Electronics Inc.: "Support for VOIP Over MAC-hs/ehs", 3GPP Draft; R2-071542 Support for VOIP Over MAC-HS, $3^{RD}$ Generation Partnership Project (3GPP), Mobile Competence Centre; vol. RAN WG2, no. St. Julian; Apr. 2, 2007, XP050134474.

Sammour et al., U.S. Appl. No. 60/863,185.

Nokia: "Active Mode DRX", 3GPP TSG-RAN WG2 Meeting #55, Seoul, Korea, Oct. 9-11, 2006, R2-062752.

NTT DoCoMo, Inc.: "Views on DRX/DTX control in LTE", 3GPP TSG RAN WG2 #56, Riga, Lativa, Nov. 6-10, 2006, R2-063397.

Email Rapporteur (Nokia): "DRX in E-UTRAN", 3GPP TSG-RAN WG2 Meeting #57, St. Louis, Missouri, Feb. 12-16, 2007, R2-070463.

LG Electronics: "Discussion on Message 4 in Random Access", 3GPP TSG-RAN WG2, #57, St. Louis, Missouri, Feb. 15-19, 2007, R2-070519.

LG Electronics: "Discussion on Message 4 in Random Access", 3GPP TSG-RAN WG2, #57bis, St. Julian's Malta, Mar. 26-30, 2007, R2-071456.

LG Electronics: "Discussion on Message 4 in Random Access", 3GPP TSG-RAN WG2, #58, Kobe, Japan, May 7-11, 2007, R2-071923.

NTT DoCoMo, Inc: "E-mail discussion on U-plane ciphering location for LTE", 3GPP TSG RAN WG2 #57bis, St. Julian's, Malta, Mar. 26-30, 2007, R2-071293.

LG Electronics: "U-plane ciphering at MAC / Physical Layer", 3GPP TSG RAN WG2 #57bis, St. Julian's, Malta, Mar. 26-30, 2007, R2-071550.

LG Electronics, "DRX Scheme", 3GPP TSG-RAN WG2 #56bis, Jan. 15-19, 2007, Sorrento, Italy, R2-070265.

Nokia, "Discontinuous reception in Cell_fach", 3GPP TSG-RAN WG2 Meeting #58, St. Julian's, Malta, Mar. 26-30, 2007, R2-071403.

Catt, "Non-synchronized access and C-RNTI allocation", 3GPP WSG-RAN WG2, #55, Seoul, Korea, Oct. 9-13, 2006, R2-062933.

Catt, "Non-synchronized access and C-RNTI allocation", 3GPP TSG-RAN WG2 #55, Seoul, Korea, Oct. 9-13, 2006, R2-062933.

LG Electronics, Multi-level DRX Operation in CELL_PCH, 3GPP TSG-RAN WG2 #58, R2-071930, May 7-11, 2007.

NEC, Fast setup for PS services (Cell PCH & URA PCH), 3GPP TSG-RAN2 Meeting #54, Tdoc R2-062328, Aug. 28, 2006-Sep. 1, 2006.

Ericsson: "MAC header for improved L2 support for high data rates", 3GPP TSG-RAN WG2 #57, St. Louis, Missouri, Feb. 12-16, 2007, R2-070810.

Ericsson: "Initial Random Access Procedure for E-UTRAN", 3GPP TSG-RAN WG2 #55, Seoul, Korea, Oct. 9-13, 2006, R2-062853.

Samsung: "LTE Random access procedure", 3GPP TSG RAN #54, Tallinn, Estonia, Aug. 28-Sep. 2, 2006, R2-062258.

Siemens: "Initial Access Procedure", 3GPP TSG-RAN WG2 LTE Adhoc meeting, Cannes, France, Jun. 27-30, 2006, R2-061931.

IPWireless: "Contention Resolution in Non-Synchronous RACH Access", RAN2 #54, Tallinn, Estonia, Aug. 28-Sep. 1, 2006, R2-062269.

Samsung, "UL Timing Sync Procedure", 3GPP TSG RAN2 #52, Athens, Greece, Mar. 27-31, 2006, R2-0601006.

Samsung, "LTE handover procedures, text proposal", 3GPP TSG-RAN3, Meeting #53, Shanghai, China, May 8-12, 2006, R2-061338.

R2-063034, "Open issues in random access procedure", Qualcomm Europe, Oct. 9 to 13, 2006 Entirety.

* cited by examiner

METHOD OF PERFORMING RANDOM ACCESS IN A WIRELESS COMMUNCATION SYSTEM

This application is a national stage entry of International Application No. PCT/KR2007/005384, filed Oct. 30 2007, and claims the benefit of U.S. application Ser. No. 60/863,545, filed Oct. 30, 2006 and Korean Application No. 10-2007-0012749, filed on Feb. 7, 2007, both of which are hereby incorporated by reference in their entireties for all purposes as if fully set forth herein.

1. Technical Field

The present invention relates to a wireless communication system, and more particularly, to a method of performing random access in a wireless communication system.

2. Background Art

In a wideband code division multiple access (WCDMA) system according to asynchronous mobile communication system standard (3GPP: $3^{rd}$ Generation Partnership Project), examples of a downlink transmission channel which transmits data from a network (UTRAN: UMTS Terrestrial Radio Access Network) to a user equipment include a broadcast channel (BCH) which transmits system information and a downlink shared channel (DL-SCH) which transmits user traffic or control messages. Traffic or control messages of downlink multicast or broadcast service (MBMS: Multimedia Broadcasting and Multicast Service) may be transmitted through the DL-SCH or a separate multicast channel (MCH). Meanwhile, examples of an uplink transmission channel which transmits data from a user equipment to a network include a random access channel (RACH) which transmits initial control message and an uplink shared channel (UL-SCH) which transmits user traffic or control messages.

Hereinafter, the RACH in the WCDMA system will be described. The RACH is used to transmit data of short length to an uplink, and some RRC messages such as RRC connection request message, cell update message, and URA update message can be transmitted through the RACH. Furthermore, a common control channel (CCCH), a dedicated control channel (DCCH), or a dedicated traffic channel (DTCH), which is one of logical channels, can be mapped with the RACH which is one of transmission channels. Furthermore, the RACH which is one of transmission channels is again mapped with a physical random access channel (PRACH) which is one of physical channels.

If a medium access control (MAC) layer of a user equipment commands a physical layer of the user equipment to perform PRACH transmission, the physical layer of the user equipment selects one access slot and one signature and transmits PRACH preamble to the uplink depending on the selected result. The preamble is transmitted for an access slot period of length of 1.33 ms, and one signature among 16 kinds of signatures is selected and transmitted for a first certain length of the access slot.

If the user equipment transmits the preamble, a base station transmits a response signal through an acquisition indicator channel (AICH) which is a downlink physical channel. The AICH transmitted in response to the preamble transmits the signature selected by the preamble for a first certain time period of an access slot corresponding to the access slot to which the preamble is transmitted. At this time, the base station transmits acknowledgement (ACK) or non-acknowledgement (NACK) through the signature transmitted from the AICH. If the user equipment receives ACK, the user equipment transmits a message part of 10 ms or 20 ms by using an orthogonal variable spreading factor (OVSF) code corresponding to the transmitted signature. If the user equipment receives NACK, the MAC of the UE again commands the physical layer of the user equipment to perform the PRACH transmission after a proper time period. Meanwhile, if the user equipment does not receive the AICH corresponding to the transmitted preamble, the user equipment transmits a new preamble at a power higher than that of the previous preamble by one level after a given access slot.

Hereinafter, examples where the user equipment transmits messages by using the RACH in the WCDMA system will be described.

In case of the first example, the user equipment which is in an idle mode transmits an initial control message to a network through the RACH. Generally, the user equipment uses the RACH when the user equipment temporally synchronizes with the network and when the user equipment desires to acquire radio resources to transmit data to an uplink. For example, if the user equipment is powered on and first accesses a new cell, the user equipment generally synchronizes with a downlink and receives system information in a cell where the user equipment desires to access. After receiving system information, the user equipment transmits an access request message for RRC connection. However, since the user equipment is not synchronized with the network temporally and does not yet acquire radio resource of the uplink, the user equipment uses the RACH. In other words, the user equipment requests the network to provide radio resources for transmission of a connection request message, through the RACH. The base station which has been requested to provide corresponding radio resources allocates proper radio resources to the user equipment so that the user equipment can transmit RRC connection request message. Then, the user equipment can transmit the RRC connection request message to the network through the radio resources.

In case of the second example, in a state that the user equipment is connected with the network in a type of RRC, the user equipment which is in an RRC connected mode uses the RACH. In this case, the user equipment is allocated with radio resources in accordance with radio resource scheduling of the network, and transmits data to the network through the allocated radio resources. However, if data to be transmitted do not remain in a buffer of the user equipment any longer, the network will not allocate radio resources of the uplink any longer. This is because that allocating radio resources of the uplink to the user equipment having no data to be transmitted is inefficient.

The buffer status of the user equipment is reported to the network periodically or whenever a specific event occurs. If new data occur in the buffer of the user equipment having no radio resources, since there are no radio resources of the uplink allocated to the user equipment, the user equipment uses the RACH. In other words, the user equipment requests the network to provide radio resources required for data transmission, through the RACH.

The RACH is an uplink common channel and is a channel available for all user equipments which desires to try initial access to the network. Accordingly, if two or more user equipments use the RACH simultaneously, collision may occur. If collision occurs due to the two or more user equipments, the network should select one of the user equipments to perform a normal procedure, and should perform next procedures for the other user equipments after resolving a problem caused by the collision. In this case, it is necessary to define a procedure of avoiding delay in procedures after random access for the selected user equipment and resolving the problem caused by collision for the other user equipments.

DISCLOSURE OF THE INVENTION

Accordingly, the present invention is directed to a method of performing random access in a wireless communication system, which substantially obviates one or more problems due to limitations and disadvantages of the related art.

An object of the present invention is to provide a method of performing random access in a wireless communication system, in which random access is provided to avoid unnecessary delay in the wireless communication system.

Another object of the present invention is to provide a method of performing random access in a wireless communication system, in which radio resources are efficiently used in the wireless communication system.

To achieve these objects and other advantages and in accordance with the purpose of the invention, as embodied and broadly described herein, a method of performing random access in a user equipment of a wireless communication system which uses multiple carriers comprises transmitting a preamble for random access to a network, receiving a random access response message from the network in response to the preamble, transmitting a connection setup request message to the network, the connection setup request message requesting connection establishment with the network, and receiving a first message from the network, the first message including connection setup information and contention resolution information in a random access procedure. If a user equipment identifier of the user equipment is included in the message, the user equipment realizes that it has succeeded in random access and performs a next procedure in accordance with the connection setup information. If the user equipment identifier of the user equipment is not included in the message, the user equipment realizes that it has failed in random access and transmits a random access preamble to the network again after the lapse of a predetermined time period.

In another aspect of the present invention, a method of performing random access in a user equipment of a wireless communication system which uses multiple carriers comprises transmitting a preamble for random access to a network in a state that the user equipment is connected with the network, receiving a random access response message from the network in response to the preamble, the random access response message including a temporary user equipment identifier of the user equipment, requesting the network to allocate uplink resources, and receiving at least one of a resource grant message and a contention resolution message from the network by using the temporary user equipment identifier and a private user equipment identifier of the user equipment.

BRIEF DESCRIPTION OF THE DRAWINGS

FIG. 3A and FIG. 3B illustrate a structure of a radio interface protocol between a user equipment (UE) and E-UTRAN, in which FIG. 3A is a schematic view of a control plane protocol and FIG. 3B is a schematic view of a user plane protocol;

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to E-UMTS (Evolved Universal Mobile Telecommunications System).

Figure 1:
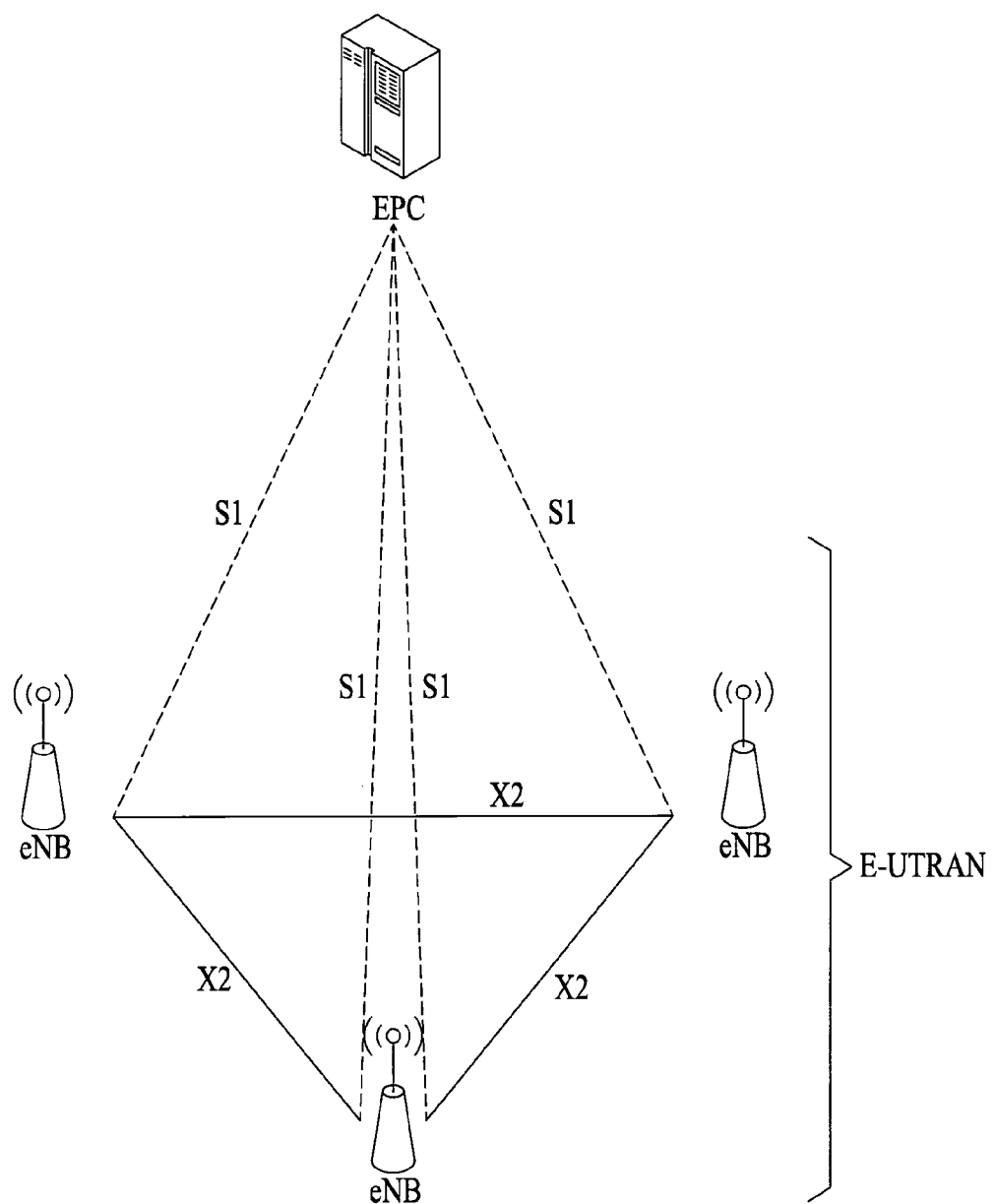
FIG. 1 illustrates a network structure of an E-UMTS (Evolved-Universal Mobile Telecommunications System)

FIG. 1 illustrates a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system. Release 7 and Release 8 of 3GPP technical specifications ($3^{rd}$ Generation Partnership Project; Technical Specification Group Radio Access Network) can be referred to obtain detailed information about the UMTS and E-UMTS.

Referring to FIG. 1, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through Si interface. The EPC includes a mobility management entity/system architecture evolution (MME/SAE) gateway.

Layers of a radio interface protocol between a UE and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the UE and the network. For this, the RRC layer enables RRC messages to be exchanged between the UE and the network. The RRC layer can be distributively located at network nodes including Node B, an AG and the like or at either the Node B or the AG.

Figure 2:
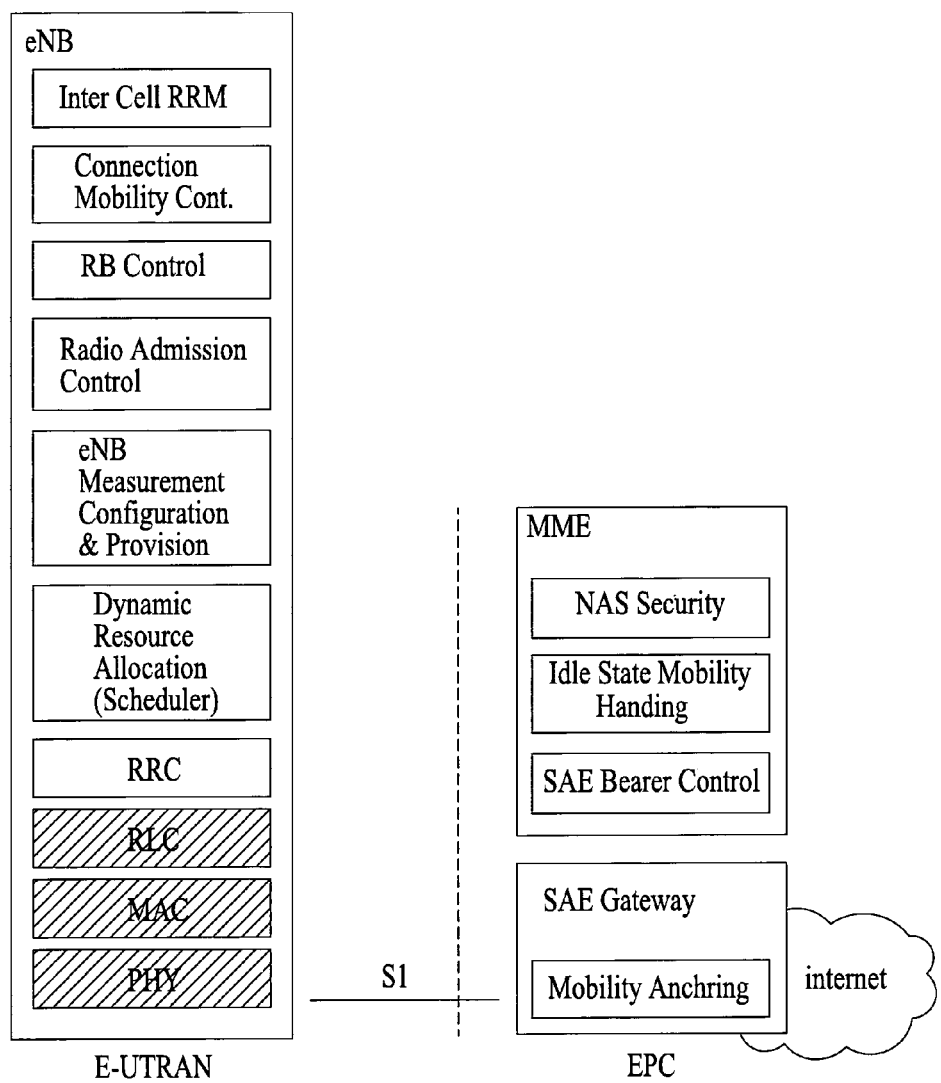
FIG. 2 is a schematic view illustrating an E-UTRAN (Evolved Universal Terrestrial Radio Access Network)

FIG. 2 is a schematic view illustrating an E-UTRAN (UMTS terrestrial radio access network). In FIG. 2, a hatching part represents functional entities of a user plane and a non-hatching part represents functional entities of a control plane.

Figure 3A:
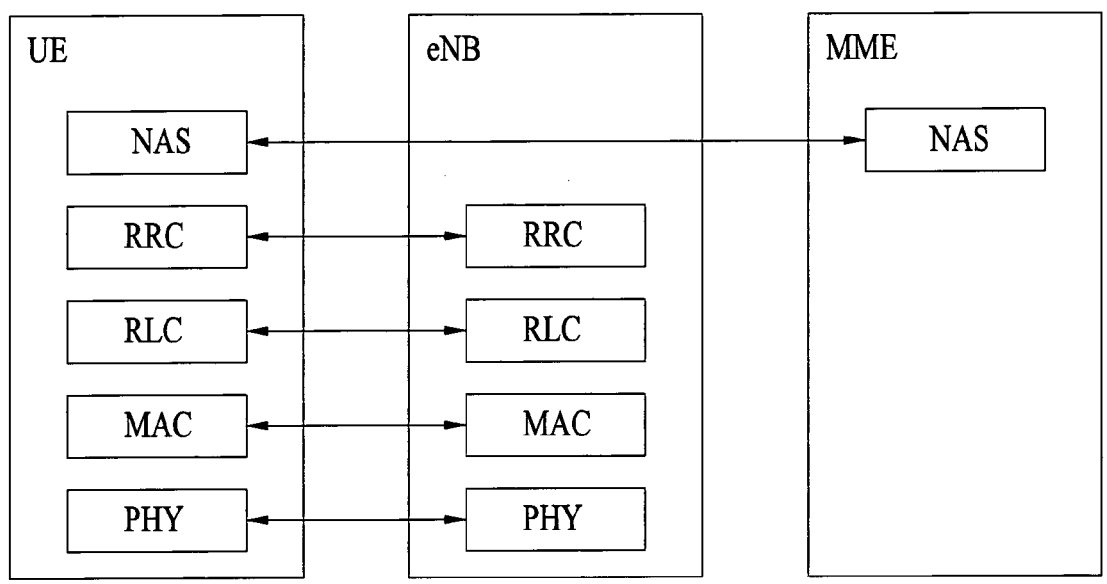
Figure 3B:
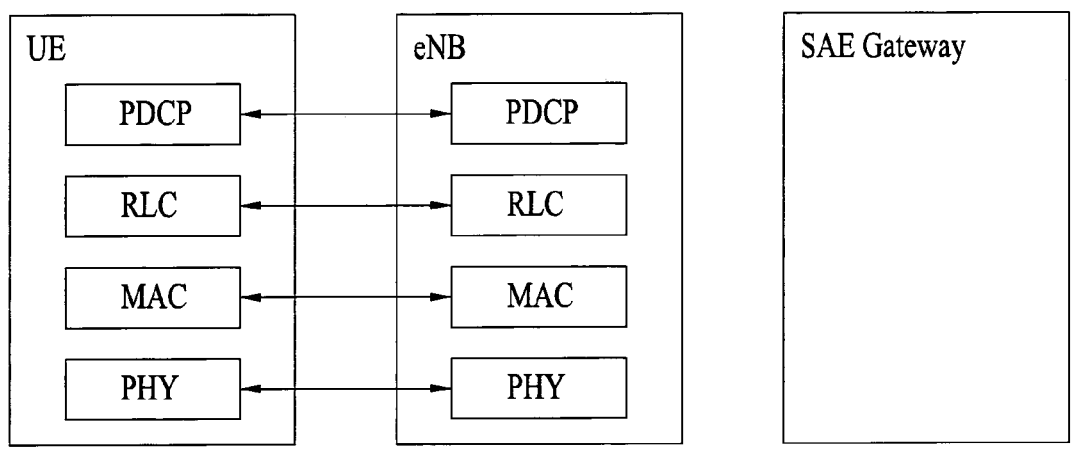

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol vertically includes a physical layer, a data link layer, and a network layer and horizontally includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated according to an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit IP packets (e.g., IPv4 or IPv6) within a radio-communication period having a narrow bandwidth, a PDCP layer of the second layer (L2) performs header compression to reduce the size of a relatively-large IP packet header containing unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the UE and the UTRAN.

As downlink transport channels carrying data from the network to UEs, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from UEs to the network, there are provided a random access channel (RACH) carrying an initial control message and an uplink shared channel (UL-SCH) carrying user traffic or control message. As logical channels located above the transport channels and mapped with the transport channels, there are provided a broadcast channel (BCCH), a paging control channel (PCCH), a common control channel (CCCH), a multicast control channel (MCCH), and a multicast traffic channel (MTCH).

In the E-UMTS system, an OFDM is used on the downlink and a single carrier frequency division multiple access (SC-FDMA) on the uplink. The OFDM scheme using multiple carriers allocates resources by unit of multiple sub-carriers including a group of carriers and utilizes an orthogonal frequency division multiple access (OFDMA) as an access scheme.

A physical layer of an OFDM or OFDMA scheme divides active carriers into a plurality of groups and transmits respective groups to different receiving sides. Radio resource allocated to each UE which is defined by a time-frequency region on a two-dimensional sphere comprises continuous sub-carriers. A time-frequency region in the OFDM or OFDMA scheme is a rectangular form sectioned by time and sub-carrier coordinates. In other words, one time-frequency region could be a rectangular form sectioned by at least one symbol on a time axis and sub-carriers on a frequency axis. Such a time-frequency region can be allocated to an uplink for a specific UE, or an eNB can transmit the time-frequency region to a specific UE in a downlink. In order to define such a time-frequency region on the two-dimensional sphere, the number of OFDM symbols and the number of continuous sub-carriers starting from a point having an offset from a reference point should be given.

The E-UMTS which is currently being discussed uses 10 ms radio frame comprising 20 sub-frames. Namely, a sub-frame has a length of 0.5 ms. A resource block comprises one sub-frame and twelve sub-carriers, each of which is 15 kHz. One sub-frame comprises a plurality of OFDM symbols and a part (for example, first symbol) of the plurality of OFDM symbols can be used for transmission of L1/L2 control information.

Figure 4:
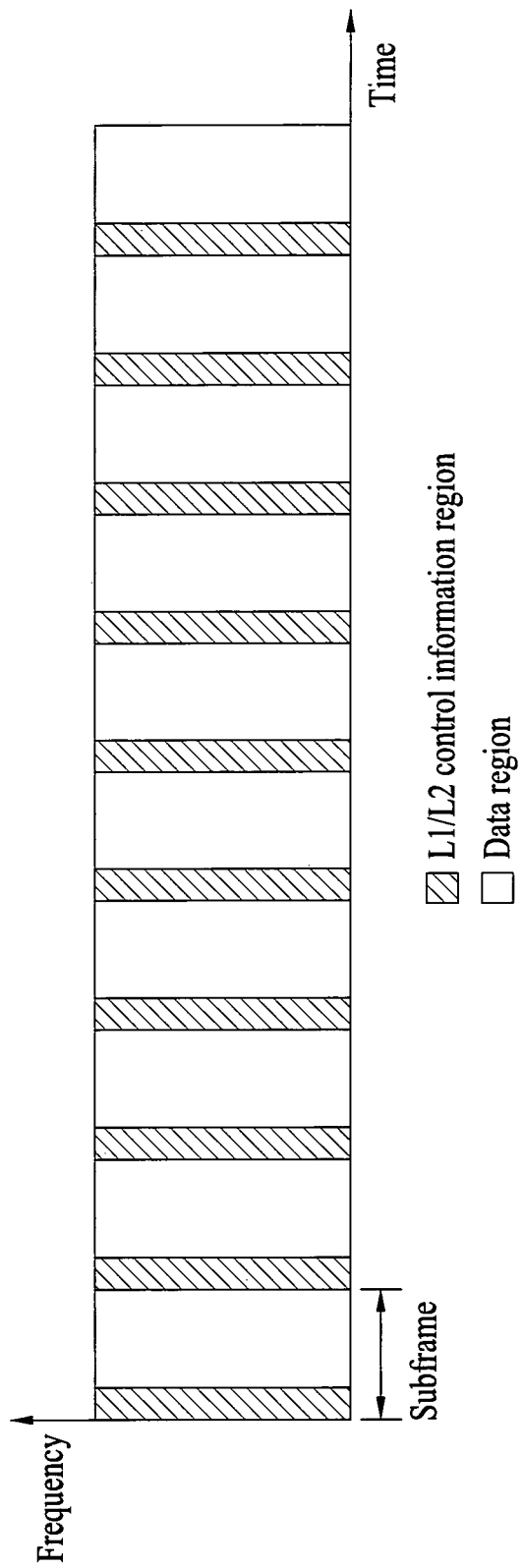
FIG. 4 illustrates an example of a structure of physical channels used in an E-UMTS system.

FIG. 4 is a diagram illustrating a structure of physical channels used in the E-UMTS. In FIG. 4, a sub-frame comprises an L1/L2 control information transmission region (the hatching part) and a data transmission region (the non-hatching part).

Figure 5:
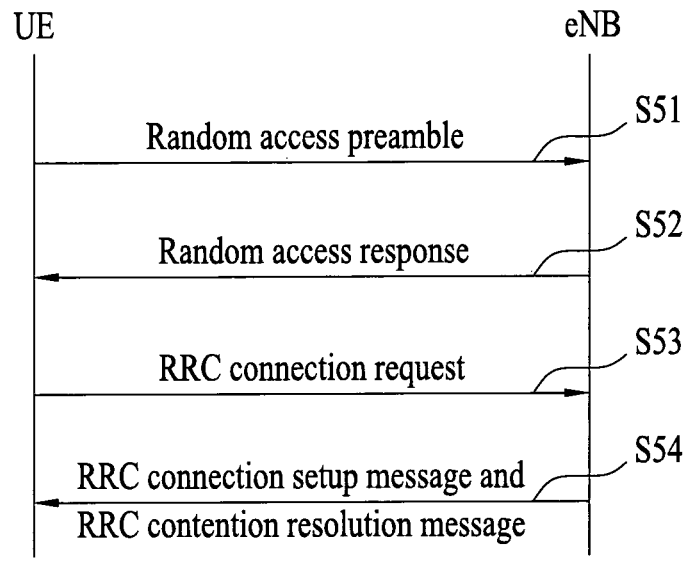
FIG. 5 is a flow chart illustrating a procedure according to one embodiment of the present invention.

FIG. 5 is a flow chart illustrating a procedure according to one embodiment of the present invention. In the embodiment of FIG. 5, technical features of the present invention are applied to a procedure of initial random access of a user equipment which is in an idle mode.

Referring to FIG. 5, the user equipment transmits a random access preamble to a base station eNB [S51]. In other words, the user equipment selects a specific signature among a plurality of signatures through one access slot and transmits the selected signature to the base station. At this time, the random access preamble may include uplink message information or channel measurement information so that the base station may perform resource allocation for uplink message transmission. In this case, if at least two user equipments simultaneously perform uplink transmission of random access preambles by using same radio resources such as same signatures, collision may occur.

The base station transmits a random access response message to the user equipment in response to the random access preamble [S52]. The random access response message includes the signature transmitted from the user equipment, grant or rejection information of the random access preamble transmission, a temporary cell radio network temporary identifier (Temporary C-RNTI) allocated to the user equipment, and control information related to transmission of the RRC connection request message, etc. The control information related to transmission of the RRC connection request message includes radio resource allocation information, a message size, and radio parameters (modulation and coding information and hybrid ARQ information) for transmission of the RRC connection request message.

The base station transmits signaling information for receiving the random access response message to the user equipment through L1/L2 control channel. The signaling information includes a random access radio network temporary identifier (RA-RNTI) indicating transmission of the random access response message and transmission parameters related to transmission of the random access response message. Since the RA-RNTI is previously forwarded from the user equipment to the base station through system information, etc., the user equipment acquires the signaling information through the L1/L2 control channel by using the RA-RNTI and receives the random access response message by using the acquired signaling information.

If the signature transmitted from the user equipment and grant information for signature transmission are included in the random access response message, the user equipment transmits the RRC connection request message to the base station [S53]. At this time, the user equipment transmits the RRC connection request message to the base station by using the uplink radio resource allocation information, the message size, and the radio parameters, which are included in the random access response message. The RRC connection request message includes a user equipment identifier for identifying the user equipment. Examples of the user equipment identifier include wideband UE identifiers such as an international mobile subscriber identity (IMSI) or a temporary mobile subscriber identity (TMSI).

If the signature transmitted from the user equipment and the rejection information of the signature transmission are included in the random access response message, or if the signature transmitted from the user equipment is not included in the random access response message, the user equipment retransmits the random access preamble after a certain time without transmitting the RRC connection request message.

If the RRC connection request message is received from the user equipment, the RRC layer of the base station transmits the RRC connection setup message or the RRC contention resolution message to the user equipment. Preferably, the RRC layer transmits one RRC message which includes the RRC connection setup message and the RRC contention resolution message. For another example, after transmitting the RRC connection setup message to the user equipment, the base station can transmit the RRC contention resolution message.

If one RRC message which including the RRC connection setup message and the RRC contention resolution message is transmitted, padding included in the message can be reduced, whereby the radio resources can be used efficiently. The RRC message includes user equipment identifier of a user equipment which has succeeded in random access. Preferably, the user equipment identifier is a user equipment identifier included in the RRC connection request message, for example, IMSI and TMSI.

If a plurality of user equipments collide with one another during a transmission procedure of the random access preamble or the RRC connection setup message, only one user equipment which has successfully performed random access is operated in accordance with the RRC connection setup message. In this case, the success of the user equipment which has succeeded in the random access means that the random access preamble transmitted from the user equipment has been successfully received by the base station and then the RRC connection request has been successfully performed.

As described above, the RRC connection setup message included in the RRC message includes the wideband user equipment identifier such as IMSI and TMSI of the user equipment which has succeeded in the random access. The user equipment receives control information required to receive the RRC message through the L1/L2 control channel by using its temporary C-RNTI. For example, the user equipment can identify whether a specific channel of the L1/L2 control channel is transmitted to itself in accordance with the result of cyclic redundancy code (CRC) test of the specific channel by using the temporary C-RNTI. For another example, the user equipment receives a message indicated by the temporary C-RNTI if the temporary C-RNTI is received through the L1/L2 control channel. If the specific channel is transmitted to the user equipment, the user equipment receives the RRC message transmitted to a downlink channel of a data region, for example, a downlink shared channel (DL-SCH) by using control information transmitted through the specific channel.

If the wideband user equipment identifier transmitted through the RRC connection request message is included in the RRC connection setup message, the user equipment realizes that it has succeeded in the random access and recognizes the RRC connection setup message as its message. At this time, the user equipment uses the temporary user equipment identifier (temporary C-RNTI) as a private C-RNTI for performing communication with a network later.

If the wideband user equipment identifier transmitted through the RRC connection request message is not included in the RRC message, the user equipment realizes that it has failed in the random access. Also, if the RRC message which includes the wideband user equipment identifier is not received for a certain time period, the user equipment realizes that it has failed in the random access. At this time, the user equipment can start a random access procedure again by retransmitting the random access preamble to the base station after a certain time period.

The aforementioned embodiments of the present invention can be applied to a random access procedure for initial access performed after radio link failure or handover.

Figure 6:
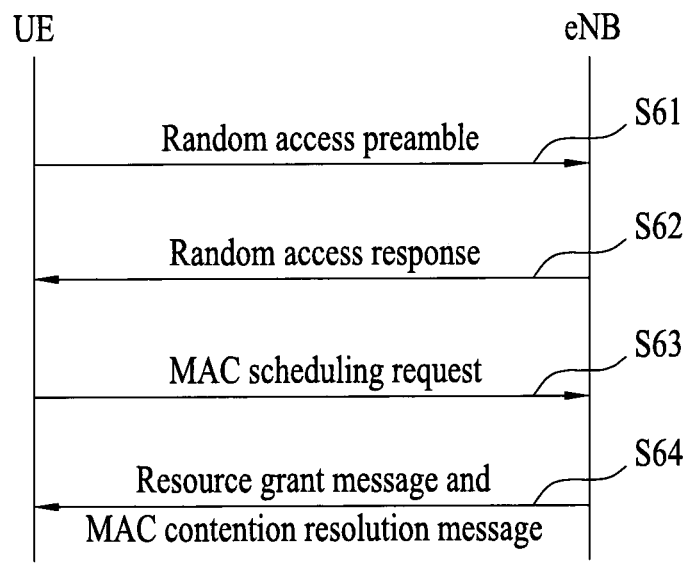
FIG. 6 is a flow chart illustrating a procedure according to another embodiment of the present invention.

FIG. 6 is a flow chart illustrating a procedure according to another embodiment of the present invention. In the embodiment of FIG. 6, technical features of the present invention are applied to a random access procedure of a user equipment which is in an RRC connected mode. For example, if radio resources for data to be transmitted to the base station are not allocated to the user equipment, the user equipment can transmit data through the random access procedure through the RACH. The embodiments described hereinafter can be applied to the case where the base station is not uplink-synchronized with the user equipment even though it has downlink data to be transmitted to the user equipment which is in the RRC connected mode.

Referring to FIG. 6, the user equipment transmits a random access preamble to the base station eNB [S61], and receives a random access response message from the base station in response to the random access preamble [S62]. Since the steps S61 and S61 are the same as S51 and S52 of FIG. 5, their detailed description will be omitted.

If the signature transmitted from the user equipment and grant information for signature transmission are included in the random access response message, the user equipment transmits a MAC scheduling request message to the base station [S63]. At this time, the user equipment transmits the MAC scheduling request message to the base station by using the uplink radio resource allocation information, the message size, and the radio parameters, which are included in the random access response message. Preferably, the MAC scheduling request message includes a wideband user equipment identifier for identifying the user equipment. Examples of the user equipment identifier include wideband UE identifiers such as international mobile subscriber identity (IMSI) or temporary mobile subscriber identity (TMSI). The embodiment of FIG. 6 is different from that of FIG. 5 in that scheduling request and contention resolution procedures are performed by the MAC layer.

If the signature transmitted from the user equipment and the rejection information of the signature transmission are included in the random access response message, or if the signature transmitted from the user equipment is not included in the random access response message, the user equipment retransmits the random access preamble after a certain time without transmitting the MAC scheduling request message.

If the MAC scheduling request message is received from the user equipment, the MAC layer of the base station transmits a resource grant message and MAC contention resolution message to the user equipment [S64]. The base station may simultaneously transmit the resource grant message and the MAC contention resolution message or may transmit the MAC contention resolution message after transmitting the resource grant message.

The resource grant message may be transmitted through the L1/L2 control channel, or may be transmitted through L1 signaling by using a physical channel for resource allocation, such as an absolute grant channel (AGCH) or a relative grant channel (RGCH). On the other hand, the MAC contention resolution message may be transmitted in a type of MAC control PDU. Alternatively, the base station may transmit the resource grant message and the MAC contention resolution message in a type of one MAC control PDU by combining them with each other. Moreover, a method of transmitting the resource grant message and the MAC contention resolution message to the user equipment through the L1/L2 control channel may be considered. The MAC control PDU includes a header and a payload, wherein the header may include information indicating the MAC control PDU, and an indicator indicating that the resource grant message or the MAC contention resolution message is included in the MAC control PDU. The payload may include contents of the resource grant message or the MAC contention resolution message.

If the MAC contention resolution message is transmitted in a type of one MAC control PDU, the MAC control PDU includes a private C-RNTI of the user equipment which has succeeded in the random access. If the private C-RNTI of the user equipment is included in one MAC control PDU, a problem may occur in that radio resources are wasted. Accordingly, private C-RNTIs of a plurality of user equipments which have successfully performed random access for a certain time period can be included in one MAC contention resolution message.

Since the user equipment which is in the RRC connected mode previously knows its private C-RNTI before trying random access, the base station transmits the resource grant message which includes the private C-RNTI of the user equipment which has passed contention. If the resource grant message is transmitted through L1 signaling, the user equipment recognizes the resource grant message as its message when receiving the resource grant message, which includes the private C-RNTI, through the resource allocation channel or the L1/L2 control channel. However, when receiving the resource grant message, which does not include the private C-RNTI of the user equipment, through the resource allocation channel or the L1/L2 control channel, the user equipment does not recognize the resource grant message as its message.

If the resource grant message is transmitted in a type of the MAC control PDU, the control information included in the L1/L2 control channel includes the private C-RNTI of the user equipment to instruct transmission of the MAC control PDU. Accordingly, the user equipment receives the resource grant message only if the private C-RNTI is included in the L1/L2 control channel.

The control information transmitted from the base station through the L1/L2 control channel to instruct transmission of the MAC contention resolution message includes the temporary C-RNTI. Accordingly, the user equipment can receive the MAC contention resolution message only if the temporary C-RNTI is included in the L1/L2 control channel. The temporary C-RNTI is a user equipment identifier allocated from the base station through the random access response message. If the temporary C-RNTI is received through the L1/L2 control channel, the user equipment receives the MAC contention resolution message by using the control information transmitted through the L1/L2 control channel. The MAC contention resolution message includes a wideband user equipment identifier which has passed contention.

If the resource grant message is transmitted to the user equipment through the L1/L2 control channel and the MAC contention resolution message is transmitted to the user equipment through the data region, the operation of the user equipment will be described hereinafter.

If the temporary C-RNTI of the user equipment is received through the L1/L2 control channel before receiving the resource grant message from the base station and the MAC contention resolution message indicated by the temporary C-RNTI is received, the user equipment identifies whether the MAC contention resolution message includes the private C-RNTI of the user equipment. If the private C-RNTI of the user equipment is included in the MAC contention resolution message, the user equipment recognizes that it has succeeded in the random access and monitors reception of the resource grant message, which includes the private C-RNTI of the user equipment, through the L1/L2 control channel. If the resource grant message is not received within a certain time period which is previously set, the user equipment starts the random access procedure again. If the resource grant message is received within the certain time period, the user equipment transmits uplink data to the base station through the radio resources allocated by the resource grant message.

If the user equipment receives the resource grant message, which includes the private C-RNTI, through the L1/L2 control channel before receiving the MAC contention resolution message, the user equipment realizes that it has successfully performed the random access regardless of reception of the MAC contention resolution message, and transmits uplink data to the base station through the radio resources allocated by the resource grant message. If the user equipment receives its temporary C-RNTI through the L1/L2 control channel after receiving the resource grant message, the user equipment disregards packet data indicated by the temporary C-RNTI.

In FIG. 5 and FIG. 6, the contention resolution message and the connection setup message or the resource grant message may include the signature transmitted from the user equipment and included in the random access preamble or information related to the radio resources used for the random access preamble. For another example, the contention resolution message and the connection setup message or the resource grant message may include information related to the radio resources used to transmit the connection request message or the scheduling request message. The radio resources include information related to frequency and/or time. At this time, if the preamble signature transmitted from the user equipment or the information related to the radio resources is included in the contention resolution message and the connection setup message or the resource grant message, the user equipment recognizes the contention resolution message and the connection setup message or the resource grant message as its messages and is operated in accordance with contents of the contention resolution message and the connection setup message or the resource grant message.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on data transmission and reception between the base station and the user equipment. In this case, the base station means a terminal node of a network, which performs direct communication with the user equipment. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station and mobile subscriber station.

The embodiments according to the present invention may be implemented by various means, for example, hardware, firmware, software, or their combination. If the embodiment according to the present invention is implemented by hardware, the random access method in the wireless communication system according to the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the random access method in the wireless communication system according to the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

According to the present invention, unnecessary delay can be avoided in the random access procedure of the wireless communication system, and the radio resources can be used efficiently.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention can be used in a wireless communication system such as a mobile communication system or a wireless Internet system.

The invention claimed is:

1. A method of performing random access by user equipment which is in an idle mode in a wireless communication system using multiple carriers, the method comprising:
   transmitting a preamble for random access to a network to establish a radio resource control (RRC) connection with the network;
   receiving a random access response message from the network in response to the preamble, the random access response message comprising uplink resource allocation information and a temporary identifier of the user equipment;
   transmitting an RRC connection setup request message to the network through uplink resources allocated according to the uplink resource allocation information after receiving the random access response message, the RRC connection setup request message requesting connection establishment with the network, wherein the RRC connection setup request message comprises a first user equipment identifier;
   receiving control information from the network on a control channel, the control information comprising a second user equipment identifier and associated with receiving a contention resolution message;
   receiving the contention resolution message from the network using the control information when the second user equipment identifier is equal to the temporary identifier of the user equipment; and
   receiving an RRC connection setup message from the network in response to the RRC connection setup request message,
   wherein when the contention resolution message comprises the first user equipment identifier sent by the user equipment through the RRC connection setup request message, the user equipment considers the random access procedure to be successful and uses the temporary identifier of the user equipment as a private user equipment identifier (C-RNTI) for performing communications with the network.

2. The method of claim 1, wherein the first user equipment identifier is a wideband user equipment identifier.

3. The method of claim 2, wherein the wideband user equipment identifier is an international mobile subscriber identity (IMSI) or a temporary mobile subscriber identity (TMSI).

4. The method of claim 1, further comprising receiving signaling information necessary for receiving the random access response message on the control channel using a random access radio network temporary identifier (RA-RNTI) previously allocated by the network.

5. The method of claim 1, further comprising transmitting a random access preamble from the user equipment to the network when the contention resolution message does not comprise the first user equipment identifier sent by the user equipment through the connection setup request message.

6. User equipment which is in an idle mode and performs random access in a wireless communication system, the user equipment comprising:
   a processor; and
   a memory coupled to the processor, the memory comprising instructions which, when executed by the processor, cause the user equipment to:
   transmit a preamble for random access to a network to establish a radio resource control (RRC) connection with the network;
   receive a random access response message from the network in response to the preamble, the random access response message comprising uplink resource allocation information and a temporary identifier of the user equipment;
   transmit an RRC connection setup request message to the network through uplink resources allocated according to the uplink resource allocation information after receiving the random access response message, the RRC connection setup request message requesting connection establishment with the network, wherein the RRC connection setup request message comprises a first user equipment identifier;
   receive control information from the network on a control channel, the control information comprising a second user equipment identifier and associated with receiving a contention resolution message;
   receive the contention resolution message from the network using the control information when the second user equipment identifier is equal to the temporary identifier of the user equipment; and receive an RRC connection setup message from the network in response to the RRC connection setup request message, wherein when the contention resolution message comprises the first user equipment identifier sent by the user equipment through the RRC connection setup request message, the user equipment considers the random access procedure to be successful and uses the temporary identifier of the user equipment as a private user equipment identifier (C-RNTI) for performing communications with the network.

7. The user equipment of claim 6, wherein the first user equipment identifier is a wideband user equipment identifier.

8. The user equipment of claim 7, wherein the wideband user equipment identifier is an international mobile subscriber identity (IMSI) or a temporary mobile subscriber identity (TMSI).

9. The user equipment of claim 6, wherein the user equipment is further configured to receive signaling information necessary for receiving the random access response message on the control channel using a random access radio network temporary identifier (RA-RNTI) previously allocated by the network.

10. The user equipment of claim 9, wherein the user equipment is further configured to transmit a random access preamble to the network when the contention resolution message does not comprise the first user equipment identifier sent by the user equipment through the connection setup request message.

\* \* \* \* \*